United States Patent
Hofmann et al.

(10) Patent No.: US 9,778,642 B2
(45) Date of Patent: Oct. 3, 2017

(54) PROTECTION UNIT FOR A PROGRAMMABLE DATA-PROCESSING SYSTEM

(75) Inventors: Marco Hofmann, München (DE); Harry Knechtel, Berglern (DE); Gunnar Hettstedt, Markt Schwaben (DE); Marc Lindlbauer, München (DE)

(73) Assignee: secunet SECURITY NETWORKS AKTIENGESELLSCHAFT, Essen (DE)

( * ) Notice: Subject to any disclaimer, the term of this patent is extended or adjusted under 35 U.S.C. 154(b) by 1941 days.

(21) Appl. No.: 12/045,849

(22) Filed: Mar. 11, 2008

(65) Prior Publication Data

US 2008/0235473 A1  Sep. 25, 2008

(30) Foreign Application Priority Data

Mar. 12, 2007  (EP) .................... 07005046

(51) Int. Cl.
 *G06F 21/00* (2013.01)
 *G05B 19/042* (2006.01)

(52) U.S. Cl.
 CPC ............ *G05B 19/0425* (2013.01); *G05B 2219/23215* (2013.01); *G05B 2219/23464* (2013.01); *G05B 2219/24155* (2013.01); *G05B 2219/24211* (2013.01); *G05B 2219/2637* (2013.01)

(58) Field of Classification Search
 None
 See application file for complete search history.

(56) References Cited

U.S. PATENT DOCUMENTS

| 657,119 | A | 9/1900 | Kelpetko |
| 7,024,581 | B1 * | 4/2006 | Wang et al. ............... 714/2 |
| 7,149,858 | B1 * | 12/2006 | Kiselev .................... 711/162 |
| 7,685,171 | B1 * | 3/2010 | Beaverson et al. .... 707/999.202 |
| 2001/0011254 | A1 * | 8/2001 | Clark ............... G06F 21/125 705/59 |
| 2002/0124185 | A1 * | 9/2002 | Caspi ............. H04L 63/1408 726/24 |
| 2003/0115474 | A1 * | 6/2003 | Khan et al. .............. 713/186 |

(Continued)

FOREIGN PATENT DOCUMENTS

| DE | 10205809 | 2/2002 | |
| JP | 2004355083 A | * 12/2004 | ............ G06F 12/14 |

*Primary Examiner* — David Le
(74) *Attorney, Agent, or Firm* — Andrew Wilford

(57) ABSTRACT

A data-processing system having at least one operating memory holding operating data is provided with a protection unit having an execution environment protected from unauthorized access. At least one monitoring logic in the execution environment is connected to the operating memory for monitoring unauthorized modifications, access, or similar protection violations of the operating data stored in the operating memory and for generating an output on detection of such a protection violation. A protection logic in the execution environment holds replacement data capable of replacing the operating data and is connected to the monitoring logic for, on generation of the output, providing to the operating memory the replacement data for the operation or for a substitute operation of the data-processing system.

14 Claims, 1 Drawing Sheet

(56) References Cited

U.S. PATENT DOCUMENTS

| | | |
|---|---|---|
| 2004/0117771 A1* | 6/2004 | Venkatapathy ..... G06F 11/3624 717/130 |
| 2004/0153286 A1 | 8/2004 | Yamada ........................ 702/183 |
| 2005/0071022 A1 | 3/2005 | Izzo .............................. 700/79 |
| 2005/0086666 A1* | 4/2005 | Nason et al. ................. 719/321 |
| 2005/0268092 A1* | 12/2005 | Shankar ................ G06F 21/575 713/164 |
| 2006/0171683 A1* | 8/2006 | Battaglia et al. ............. 386/107 |
| 2006/0241913 A1 | 10/2006 | De Groot ...................... 702/188 |
| 2006/0259704 A1* | 11/2006 | Wyman ................. G06F 9/3851 711/141 |
| 2008/0016127 A1* | 1/2008 | Field ............................ 707/202 |
| 2008/0235473 A1* | 9/2008 | Hofmann et al. ............ 711/163 |

\* cited by examiner

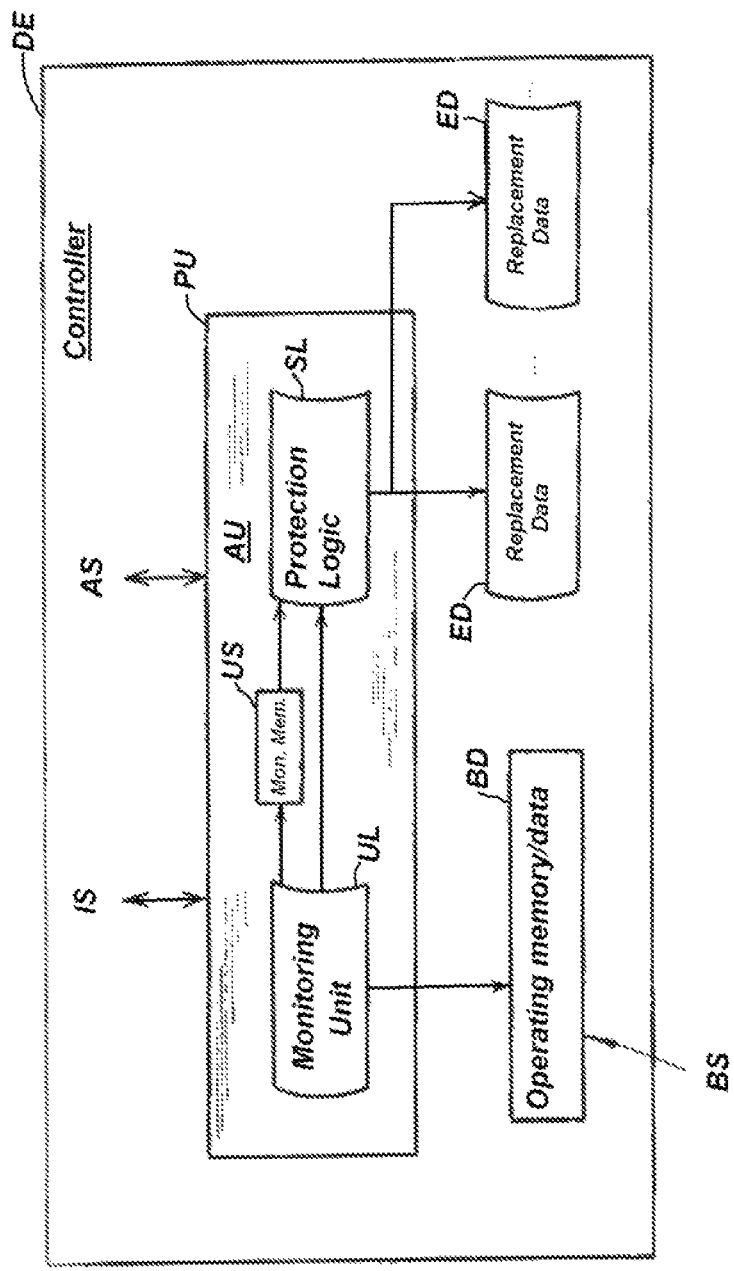

PROTECTION UNIT FOR A PROGRAMMABLE DATA-PROCESSING SYSTEM

FIELD OF THE INVENTION

The present invention relates to a protection unit for a data-processing system.

BACKGROUND OF THE INVENTION

A standard programmable data-processing system has at least one operating memory in which operating data can be stored or is stored for the operation of the data-processing system. Such a system here refers more specifically to a controller in a motor vehicle, airplane, ship, a machine in an assembly line, or a remotely administered plant. Such data-processing systems, such as programmable controllers, are currently integrated into modern vehicles in large numbers and in a great variety. Increasingly they are networked to their environment, especially since areas of "infotainment," or traffic detection systems are becoming increasingly more important.

It is generally known to protect data-processing systems, such as personal computers that are connected to computer networks or example the internet, from viruses or attacks by means of antivirus software or other programs. Such developments have not had any influence at all on the reliability or safety of dedicated data-processing systems in, for example, motor vehicles.

Objects of the Invention

It is therefore an object of the present invention to provide an improved protection unit for a programmable data-processing system.

Another object is the provision of such an improved protection unit for a programmable data-processing system, for example a motor-vehicle controller, that overcomes the above-given disadvantages, in particular that ensures reliable and safe operation of the data-processing system.

Yet another object of the invention is to provide an improved method of operating a data-processing system, such as an on-board motor-vehicle controller, while protecting it against tampering.

SUMMARY OF THE INVENTION

A data-processing system has at least one operating memory holding operating data and a protection unit having according to the invention an execution environment protected from unauthorized access. At least one monitoring logic in the execution environment is connected to the operating memory for monitoring unauthorized modifications, access, or similar protection violations of the operating data stored in the operating memory and for generating an output on detection of such a protection violation. A protection logic in the execution environment holds replacement data capable of replacing the operating data and is connected to the monitoring logic for, on generation of the output, providing to the operating memory the replacement data for the operation or for a substitute operation of the data-processing system.

Here according to the invention operating data on one hand, and replacement data on the other hand are code, data, programs, memory areas, or the like, that determine or influence the operation of the data-processing system. A protection violation here means in particular unauthorized access to the operating memory or the operating data as well as unauthorized modifications to the operating data.

In accordance with the invention a protection unit for a programmable data-processing system, such as a controller of a motor vehicle, is therefore provided that protects the data-processing system against unauthorized access, or unauthorized modifications of the operating data. Unauthorized modifications of the data and thus protection violations of the data-processing system can be detected continuously or cyclically by means of the monitoring logic of the protection unit. Corresponding test programs or monitoring logic are stored in the protected environment of protection unit in a tamper-proof manner and are executed in a tamper-proof manner. In particular, the protection unit is protected against unauthorized reading or writing of data by means of these programs. If the monitoring logic detects a protection violation, it will notify the protection logic that in turn provides uncompromised replacement data for the operation, or for a substitute operation of the data-processing system. This replacement data, or the replacement data operation thus form "emergency operation instructions."

In this regard the invention is based on the recognition that it is not only essential to detect tampering with or unauthorized access to the operating memory, but that despite such a protection violation error-free operation, or at least an "emergency running operation," or "substitute operation" of the data-processing system must be ensured. This ensures, for example in motor vehicles, that in case of an unauthorized manipulation at least one emergency running operation or emergency operation is provided. This consideration particularly allows for the fact that progressive electrification, or automation of the primary driving functions in motor vehicles (drive-by wireless technology) makes increased demands on safety. It must be ensured at all times that the controllers involved behave in accordance with specifications, and that in case of fail-safe emergency running instructions can be reverted to in a quick manner. The safety device according to the invention thus forms a safe trust anchor that imparts full efficiency to protection measures, and can in a timely manner quickly execute the protection operation in order to prevent dangerous behavior of the motor vehicle caused by manipulation of its controllers.

Advantageous further embodiments of the invention are explained as follows. It is provided that the safety device has at least one monitoring memory that stores information on one or more protection violation detected. Furthermore, an information interface is preferably provided that can read information on the protection violations and/or other status information from the protection unit. Information on the protection violations detected by the monitoring logic and the start of the emergency running instructions or the replacement data from the monitoring memory can be read in an authorized manner by means of this information interface and provided to the relevant devices to notify the user. The authorization information required for reading is stored in the execution environment. For this purpose, different authorization information can be stored in the execution environment so that different memory areas can be read depending on the authorization information provided to the information interface. Thus role models can be provided for the access to the monitoring memory.

According to a further feature of the invention, the protection unit has an administration interface. Authorization information of the execution environment can be exchanged by means of this administration interface. For this purpose, the execution environment receives at least one piece of initial authorization information. In this manner, new authorization information, as well as new monitoring logics, and/or protection logics can be incorporated into the execution environment after successful external authorization.

The execution environment for the execution logic of the protection unit is preferably hardware, or in the form of hardware. This execution environment forms a runtime environment for the logics and the memory described above and is protected against unauthorized writing and reading access. The execution environment comprises the authorization information in order to be able to safely execute the emergency running instructions, or the substitute operation, i.e. not until successful authorization. The execution environment further comprises the authorization information in order to be able to reload modified protection logic, and/or monitoring logics in the protection unit in an authorized manner. These may be, for example, cryptographic keys that can check the signatures of the logics, or can possibly decode the logic.

It is further within the scope of the invention that the monitoring logic may be part of the execution environment and therefore part of the underlying hardware. In this case the monitoring logic is thus built or integrated into the hardware. However, the monitoring logic is preferably software. Software within the scope of the invention also denotes executable code for a programmable module, such as an FPGA. Such a monitoring logic embodied as software is preferably not loaded into the execution environment until the time of execution. Storage is effected either within the protection unit or in a memory area of the data-processing system. Before the monitoring logic is executed the execution environment verifies by means of the authorization information stored within whether the monitoring logic is authorized to execute. At runtime, the monitoring logic forms with the data-processing system an interface by means of which the corresponding data (or programs/memory areas) can be "permanently" verified for correctness by means of a respective logic unit. This can, for example, be done by verifying an electronic signature of the data (or programs/memory areas) via cryptographic mechanisms, or by monitoring memory thresholds that may not be deviated from by any executed program. For example, malicious modifications to the code by viruses, Trojan horses, buffer overflows, etc, can be recognized in this manner.

The protection logic can also be part of the execution environment and thus of the underlying hardware, and therefore it may also be hardware. However, preferably the protection logic is also software. In this case, software also comprises an executable code for a programmable module, such as an FPGA. Thus the protection logic can also not be loaded into the execution environment until the time of execution. Storage is in the protection unit or in a memory area of the data-processing system.

Furthermore according to the invention the monitoring memory, the information interface, the administration interface, and/or the operating data, or the operating memory are in software, or code for a programmable module (FPGA).

Another object of the invention is also a data-processing system, such as a controller for a motor vehicle or the like, having at least one protection unit of the type described above. The invention thus also includes within the scope of protection the combination of a data-processing system on one hand, and a protection unit on the other hand, i.e. a data-processing system, into which at least one protection unit is integrated.

According to the method of the invention the monitoring logic accesses the operating memory and determines possible protection violations. Then the monitoring logic notifies the protection logic in case of a protection violation, and the protection logic provides replacement data for the operation of the data-processing system or for a substitute operation in case of a protection violation. Information on detected protection violation(s) is stored in a monitoring memory. To this end, the monitoring logic can continuously or preferably cyclically (such as quasi-continuously) access the operating memory at a predetermined clock frequency. In order to verify any protection violations, for example, a verification of an electronic signature of the operating data is executed.

Therefore, the memory of the data-processing system is "constantly" being checked by the monitoring logic within the scope of the invention. This can occur, for example, by verifying an electronic signature of the data by means of cryptographic mechanisms or by monitoring memory thresholds that may not be deviated from by an executed program. Any malicious modifications to the code by means of viruses, Trojan horses, buffer overflows, etc, can be recognized in this manner. The sampling rate, i.e. the frequency, at which the correctness of the data is checked by the monitoring logic, can be configured via the administration interface. If the monitoring logic has recognized a protection violation, it notifies the protection logic of the type of protection violation. Before the protection logic is executed, the execution environment checks by means of the authorization information stored there whether the protection logic is authorized to execute. The protection logic accepts data only from a monitoring logic that has been authorized by the execution environment. For the runtime, the protection logic forms an interface to the data-processing system by means of which access by the data-processing system to the data affected by the protection violation is prevented.

It is of considerable importance that different replacement data can be provided depending on the type of protection violation. The protection logic thus activates one set of stored replacement data or emergency running instructions in a fail-safe manner. To this end, the appropriate emergency running instructions are verified by means of the authorization information stored in the execution environment and is executed in case of success. If the authorization fails, initial emergency running instructions are stored in the protection logic itself that is then executed. Depending on the characteristic of the protection logic, the protection unit then executes the emergency running instructions. If the protection logic does not handle the execution of the emergency running instructions, the emergency running instructions are transferred to the data-processing system for execution, and execution is started in the runtime environment of the data-processing system via the interface of the protection logic. Subsequently the monitoring logic handles the monitoring of the emergency running instructions are executed, instead of the data monitored by the protection violation.

Thus the replacement data described within the scope of the invention, which is also called "emergency running instructions," is preferably logic, or multiple logics, which are executed either within the protection unit, instead of and hence as a substitute for the operating data available in the data-processing system, or also outside of the protection unit in the data-processing system by means of the protection logic. In each case each set of emergency running instructions receives authorization information, such as an electronic signature that enables safe verification of the authorization of the emergency running instructions by means of the protection logic within the execution environment. The emergency running instructions are always executed after successful authorization only. The storage of the emergency running instructions or of the replacement data is handled by the protection unit. As an alternative, the replacement data, or the emergency running instructions, can also be stored in a memory area of the data-processing system, and then safely loaded by the protection logic. Corresponding replacement data, or emergency running instructions can be reloaded into the protection unit or the data-processing system by means of the authorization information in the execution environment in an authorized manner.

BRIEF DESCRIPTION OF THE DRAWING

The above and other objects, features, and advantages will become more readily apparent from the following description, reference being made to the accompanying drawing whose sole FIGURE is a block diagram of the protection unit and data-processing system according to the invention.

SPECIFIC DESCRIPTION

As seen in the drawing a data-processing system DE can be a controller of a motor vehicle, such as an air-bag controller, a motor controller, a transmission controller, or the like. This data-processing system or controller DE has an operating memory BS in which operating data BD is stored for the operation of this controller DE. This operating data BD may also represent operating programs or the like.

The drawing indicates that according to the invention a protection unit PU is integrated into this data-processing system or controller DE. This protection unit provides an execution environment AU that is protected from unauthorized access and is formed for example as a hardware module.

A monitoring logic UL and a protection logic SL are integrated into the protection unit PU. These logics UL and SL are formed, for example, by programmable modules (FPGSs), or the code held in such an FPGA. A monitoring memory US is also provided in the protection unit PU. Communication of the protection unit PU is conducted by means of an information interface IS, as well as by means of an administration interface AS.

The protection unit PU according to the invention preferably operates as follows:

Operating data BD, or operating programs, or the like, are stored in the operating memory BS as required for the operation of the respective controller DE, for example for air-bag control. In order to ensure safe operation of such a controller DE, the protection unit PU permanent monitors unauthorized access or unauthorized modifications of such operating data thus carries out a verification or monitoring of such unauthorized protection violations.

If the monitoring logic UL detects such a protection violation, information on the type of this protection violation as well as other information such as the time of the protection information is stored in the monitoring memory US. Furthermore, the monitoring logic UL notifies the protection logic SL of the type of protection violation. Depending on the type of protection violation, the protection logic SL can now provide replacement data ED for a substitute operation of the controller DE. Such replacement data ED thus forms emergency running instructions for an emergency running operation, or emergency operation of the controller DE. The drawing shows that the protection logic SL can provide different replacement data ED, or different emergency running instructions depending on the type of protection violation detected. Thus, a flexible response can be provided to the type, or degree of, the protection violation, in that prepared, suitable emergency running instructions ED are activated in each case.

Information on the protection violation and on the start of a substitute operation (or emergency running instructions) can be read from the monitoring memory US in an authorized manner, and provided to the devices, e.g. an alarm, for notifying the user by means of the monitoring logic UL. The authorization information required in this regard is stored in the execution environment AU.

Particular authorization information of the execution environment can also be exchanged by means of the administration interface AS also indicated in the drawing. Thus, after successful outside authorization (such as by means of an administrator) new authorization information may be imbedded, and the monitoring logic UL, and/or a protection logic SL may be loaded with a new execution environment by means of the administration interface AS, insofar as the protection logic SL itself is not hardware, but instead as, for example, an FPGA code.

The execution environment AU indicated only represents a runtime environment protected against unauthorized write and read access of the above-referenced logics and memories. The execution environment AU comprises the authorization information and cryptographic keys by means of which respective signatures of the logics described can be verified, or the logics can possibly be decoded.

Overall, the protection unit according to the invention ensures safe operation of a controller or the like, for example in a motor vehicle. This is achieved although such motor vehicles are usually not permanently "online." A continuous online updating of, for example, antivirus software is not necessary. By means of cross-linking controllers within motor vehicles, any tampering with or failures of online access would be particularly critical, since particular risks could be posed to passengers due to unauthorized access to safety-relevant functions via the bus systems. The invention finds a remedy in this regard by creating a safe assurance anchor within the motor vehicle that, for example, may be under the sole control of an automobile manufacturer, thus lending full effectiveness to the protective measures. Protection operations are rapidly executed, and dangerous behavior of the motor vehicle by manipulation of controllers is prevented in due time.

We claim:

1. In combination with a vehicle having a data-processing system including at least one operating memory holding all of the operating data needed for controlling the vehicle, a protection unit being integrated into the data-processing system and comprising:

an execution environment forming a runtime environment protected from unauthorized read and write access;

at least one monitoring logic in the protected runtime environment connected to the operating memory for monitoring protection violations of the operating data stored in the operating memory and for generating an output on detection of such a protection violation; and a protection logic in the protected runtime environment holding uncompromised replacement data capable of replacing all of the operating data and holding authorization information required for use of the replacement data, only the protection logic being capable of using the replacement data to operate the data-processing system of vehicle, the protection logic being connected to the monitoring logic for, on generation of the output, executing the replacement data from the protected runtime environment instead of the operating data in the operating memory for controlling the vehicle or replacing the operating data in the operating memory with the replacement data and executing the replacement data from the operating memory for emergency operation independent of the replaced operating data.

2. The combination defined in claim 1 wherein the monitoring logic is tamper proof.

3. The combination defined in claim 1 wherein the execution environment, after successful authorization by an administration interface, can replace the authorization information, the monitoring logic, or the protection logic in the operating environment.

4. The combination defined in claim 1 wherein, at runtime, the monitoring logic forms with the data-processing system an interface that can permanently verify the corresponding data for correctness by a respective logic unit by verifying an electronic signature of the data via cryptographic mechanisms, or by monitoring memory thresholds that may not be deviated from by any executed program.

5. A method of operating a data-processing system of a vehicle and having an operating memory holding operating data for controlling the vehicle, the method comprising the step of:
   providing an execution environment holding authorization information, integrated into the data-processing system, forming a runtime environment protected from unauthorized read and write access, and having a protection logic;
   storing uncompromised replacement data in the protected runtime environment, the protection logic together with the uncompromised replacement data being capable of replacing the operating data stored in the operating memory and operating the data-processing system for the vehicle;
   from a monitoring logic in the runtime environment, monitoring the operating memory for protection violations of the operating data and generating an output on detection of such a protection violation; and
   in response to a detected protection violation,
   verifying the replacement data by the authorization information stored in the execution environment and then either
      executing the replacement data from the protected runtime environment instead of the operating data stored in the operating memory or
      replacing the operating data stored in the operating memory and executing the replacement data from the operating memory and thereby enabling emergency operation independent of the replaced operating data.

6. The method defined in claim 5 wherein the operating data is monitored periodically in accordance with a predetermined clock frequency.

7. The method defined in claim 5, further comprising the step of setting up the system by:
   loading the operating data into the operating memory, and thereafter loading the operating data into the protected runtime environment.

8. The method defined in claim 5, further comprising the step after setting up the system and before operating the vehicle with the system of: verifying that the operating data in the operating memory is authorized.

9. The method defined in claim 5, further comprising the step of setting up the system by:
   loading the protection logic into the operating environment.

10. The method defined in claim 5, further comprising the step of
   verifying a protection violation by verifying an electronic signature of the operating data.

11. The method defined in claim 5, wherein different replacement data on the type of protection violation are held in the protection logic, the method further comprising the steps of:
   activating by the protection logic one set of stored replacement data or emergency running instructions in a fail-safe manner after verifying the appropriate emergency running instructions by authorization information stored in the execution environment and then in case of success executing the one set, and
   if the authorization fails, executing initial emergency running instructions stored in the protection logic.

12. The method defined in claim 11, wherein each set of stored replacement data has respective authorization information required for use in the operation environment.

13. The method defined in claim 11, further comprising:
   storing different authorization information in the operating environment that each authorize use of a respective set of the replacement data.

14. The method defined in claim 5, further comprising the step of setting up the system by: loading the replacement data into the protected runtime environment or into the memory of the data-processing system before loading it into the protection logic.

* * * * *